United States Patent Office 3,330,177
Patented July 11, 1967

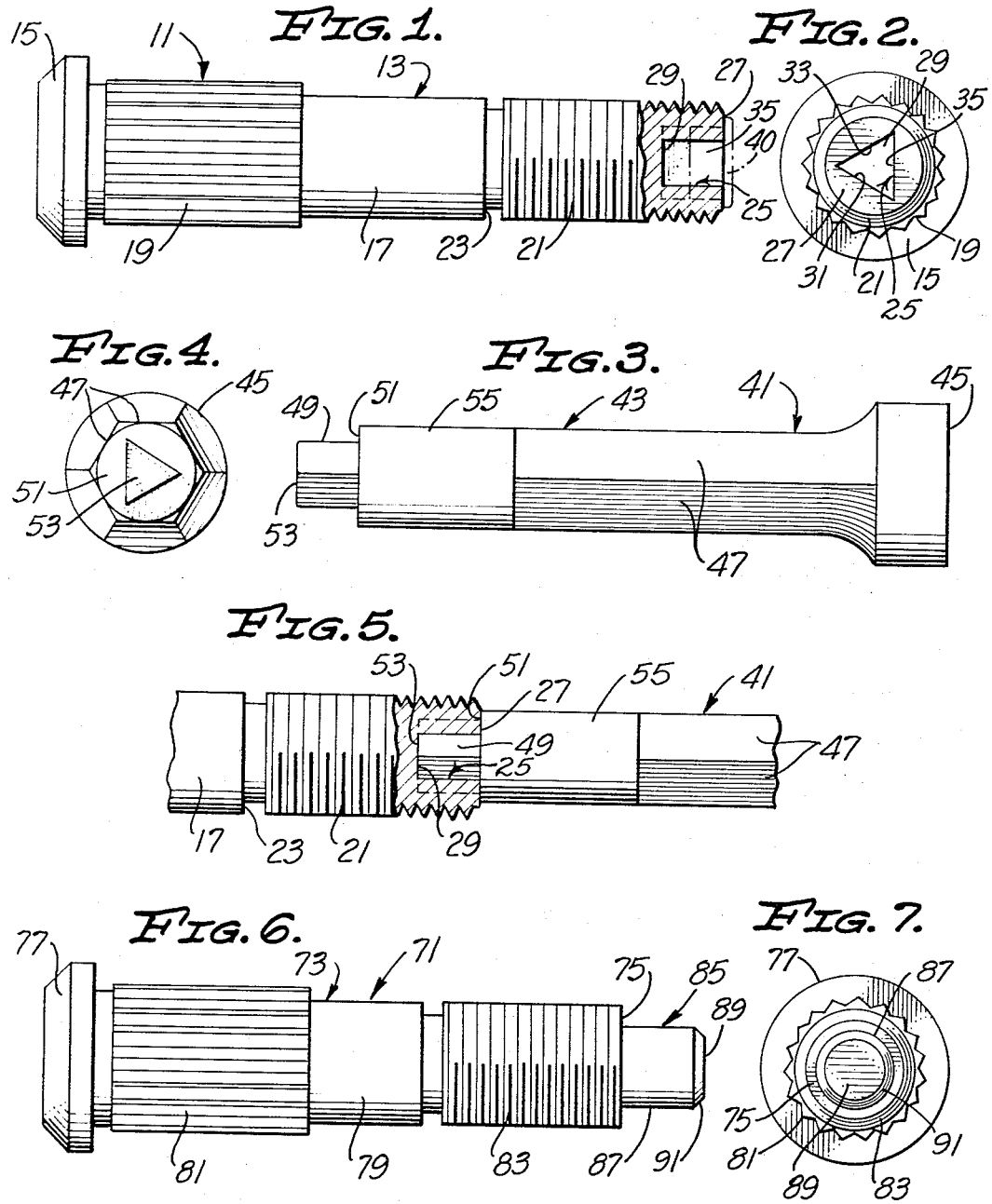

3,330,177
WHEEL STUD HAVING IMPACT RECEIVING
MEANS
Wesley H. Oliver, 519 S. Second St.,
Las Vegas, Nev. 89101
Filed Feb. 16, 1965, Ser. No. 433,092
5 Claims. (Cl. 85—1)

ABSTRACT OF THE DISCLOSURE

A generally cylindrical wheel stud with an enlarged head and longitudinal splines at one end and screw threads formed on the other end. A recess and an annular end wall are provided at the threaded end to assist is removing the stud undamaged from the wheel structure. Impact forces from hammer blows during removal are directed to the recess and end wall. A reduced-diameter extension may be provided at the threaded end in place of the recess.

This invention relates to wheel studs and more particularly to means for removing a wheel stud from the elements retaining it without damage thereto.

Wheel studs of the prior art typically include an elongated generally cylindrical shaft having an enlarged head and longitudinal splines at one end and screw threads formed on the other end thereof. Splined wheel studs such as these are utilized with a conventional nut to hold together various portions of the wheel structure such as a brake drum, a hub, and a wheel.

To perform various items of maintenance on the vehicle such as brake repair, it is necessary to remove the splined wheel studs from the wheel structure. Although the nut is usually easy to remove, the wheel stud is frequently difficult to remove because the splines thereon tend to stick or weld to the corresponding mating splines or grooves of the wheel structure. This sticking is oftentimes cause by corrosion adjacent the splines or foreign matter working between the splines. The conventional manner of attempting to remove the wheel studs from the wheeled vehicle is to hammer on the end of the wheel stud which contains the threads. As the wheel studs are frequently securely stuck in the wheel structure, it is necessary to use a large hammer such as a sledgehammer and strike exceedingly heavy blows on the end of the wheel stud. Inaccurate hammer blows may strike the edges of the wheel stud end or the threads. When the end of the wheel stud and the hammer face are not parallel at the moment of impact, only the edge of the hammer face strikes the wheel stud, thereby causing stress concentration and deformation. The hammer face usually has a large area than the wheel stud end so that even if a blow is well delivered, some of the force is absorbed at the perimeter of the wheel stud end and hence by the threads forming that perimeter. Although the wheel studs are usually made of strong material, these heavy blows tend to deform the end receiving them, enlarge that end so that the nut will not longer fit thereover, and damage the screw threads.

After receiving such treatment, the wheel stud is even more difficult to remove from the wheel structure because the enlarged end caused by the hammer blows cannot be easily withdrawn through the appropriate aperture in the wheel structure thereby increasing the time and cost of vehicle maintenance. Furthermore, the wheel stud, having been deformed, is totally useless and must be replaced thereby increasing further the cost of vehicle maintenance.

Accordingly, it is an object of this invention to provide a wheel stud which can be quickly and easily hammered free from the wheel structure retaining it without damaging the screw threads.

A further object of this invention is to provide a wheel stud which can be quickly and easily hammered free from the elements retaining it without enlarging the end of the stud so that a nut of the proper size will no longer fit over the end thereof.

A futher object of this invention is to provide a wheel stud capable of repeated use even after it has been hammered free from the wheel elements retaining it.

Another object of this invention is to provide a battering removal tool which facilitates the removal of a wheel stud from the wheel structure without damaging the threads or deforming the end thereof. A particular object of this invention is to provide such a battering removal tool having wrench engaging surfaces thereon.

Another object of this invention is to provide a wheel stud having a recess opening at an annular end wall thereof and a battering removal tool for use therewith which will evenly distribute the forces between the back wall of the recess and the annular end wall.

Another object of this invention is to provide a wheel stud with a recess in the end thereof having removable sealing means closing the recess.

Briefly stated, a preferred wheel stud and removal tool constructed in accordance with the teachings of this invention include an elongated generally cylindrical member having an annular wall at one end and an enlarged head at the other end thereof. The generally cylindrical member has longitudinally extending splines adjacent the head and screw threads adjacent the annular end wall. A battering removal tool for engaging and removing the wheel stud from the vehicle and means on the wheel stud and the battering removal tool for protecting the threads when the wheel stud is being hammered from the wheel structure are provided.

In one instance, the means of the last paragraph include a protrusion of reduced cross-sectional area integral with the battering removal tool thereby forming an annular shoulder intermediate the ends of the tool. The protrusion is of a specified length and has a protrusion end. A battering removal tool recess of a depth equal to the length of the protrusion opens at the annular end wall of the wheel stud. To remove the wheel stud, the protrusion may be inserted in the recess so that the back wall of the recess engages the protrusion end simultaneously with the engagement of the annular shoulder and the annular end wall. These two areas of engagement are preferably equal to substantially equalize the forces exerted on the back wall of the recess and the annular end wall. By hammering on the free end of the tool, the wheel stud may be removed without damage to the threads thereof. According to another aspect of this invention, the battering removal tool is integral with the wheel stud.

The invention, both as to its organization and method of operation, together with further objects and advantages thereof, may best be understood by reference to the following description taken in connection with the accompanying drawing.

In the drawing:

FIG. 1 is a side elevation partly in section of a preferred wheel stud constructed in accordance with the teaching of this invention;

FIG. 2 is an end elevation of the wheel stud of FIG. 1 with the sealing means removed;

FIG. 3 is a side elevation of a preferred battering removal tool constructed in accordance with the teachings of this invention and adapted for use with the wheel stud of FIG. 1;

FIG. 4 is an end elevation of the battering removal tool of FIG. 3;

FIG. 5 is a fragmentary side elevation partly in section of the wheel stud of FIGS. 1 and 2 and the battering removal tool of FIGS. 3 and 4 in engaged position;

FIG. 6 is a side elevation of another embodiment of a wheel stud and battering removal tool; and FIG. 7 is an end elevation of the device shown in FIG. 6.

FIG. 1 shows a wheel stud 11 including an elongated substantially cylindrical member 13 having an enlarged head 15 at one end thereof. The substantially cylindrical member 13 has a curved lateral surface 17 intermediate its end and longitudinally extending splines 19 adjacent the head 15. The substantially cylindrical member 13 has screw threads 21 extending from the end thereof opposite the head 15 toward the splines 19 and may be provided with a small shoulder 23 closely adjacent the threads intermediate the splines and the threads.

Means is provided on the wheel stud 11 for protecting the threads 21 when the wheel stud is being hammered free from the wheel structure of a wheeled vehicle. Such means include a battering removal tool recess 25 opening at and preferably centered on an annular end wall 27. The diameter of the annular end wall 27 is equal to the minor, i.e., smallest diameter of the threads 21. Thus, any thread or portion thereof which terminates at the end of the stud 11 is not a part of the annular end wall 27. The battering removal tool recess 25 has a flat back wall 29 which is preferably perpendicular to the longitudinal axis of the wheel stud 11 and parallel to the annular end wall 27. The battering removal tool recess 25 preferably has a cross section which forms an equilateral triangle and includes three planar lateral walls 31, 33, and 35 (FIG. 2). The lines formed by the intersection of the planar lateral walls 31, 33, and 35 are preferably generally parallel to the longitudinal axis of the wheel stud 11.

The annular end wall 27 is preferably flat, perpendicular to the longitudinal axis of the wheel stud 11, and has a circular perimeter. The annular end wall 27 does not include any portion of the threads 21. It is preferred to have the area of the annular end wall 27 exceed slightly the area of the back wall 29. A removable cap or sealing means 40 is provided in the recess 25 to prevent foreign matter from accumulating in the recess.

The wheel stud shown in FIGS. 1 and 2 is adapted for removal from the wheel structure of a vehicle by a battering removal tool 41 shown in FIGS. 3 and 4. The battering removal tool 41 includes an elongated metal shaft 43 having an enlarged flat battering head 45 at one end and a plurality, preferably six, of flat longitudinally extending wrench engaging surfaces 47 extending from adjacent the head toward the other end thereof. In use of the battering removal tool 41, the flat head 45 will receive blows from a hammer (not shown) and the wrench engaging surfaces 47 may be engaged by a wrench to apply torque thereto.

Means is provided on the battering removal tool 41 for protecting the threads 21 when the wheel stud 11 is being hammered free from the wheeled vehicle. Such means include a protrusion 49 of reduced cross-sectional area at the end of the battering removal tool 41 remote from the head 45 and an annular flat shoulder 51 contiguous the protrusion intermediate the ends of the battering removal tool. The protrusion 49 is shaped to conform to the shape of the recess 25 and is adapted to fit slidably but snugly therein. The protrusion 49 has a flat protrusion end 53 which is generally perpendicular to the longitudinal axis of the tool and is parallel to the plane of the annular shoulder 51. The protrusion 49 preferably has the shape of a triangular prism and the edges defining the protrusion end may be slightly rounded or slightly flattened.

A cylindrical section 55 lies between the annular shoulder 51 and the ends of the wrench engaging surfaces. The annular shoulder 51 is preferably perpendicular to the longitudinal axis of the tool and has a circular perimeter. To equalize stress on the tool, the area of the protrusion end 53 is preferably equal to the area of the annular shoulder 51. The depth of the battering removal tool recess equals the length of the protrusion 49 so that the protrusion end 53 will engage the back wall 29 simultaneously with the engagement of the annular shoulder 51 and the annular end wall 27 when the tool 41 and the wheel stud 11 are in the engaging position. In the engaging position (FIG. 5), the area of engagement between the protrusion end 53 and the back wall 29 preferably equals the area of engagement between the annular end wall 27 and the annular shoulder 51 to thereby equalize the forces applied to these four surfaces. Also, in the engaging position (FIG. 5), the perimeter of the annular end wall 27 completely surrounds the perimeter of the annular shoulder 51 so that no forces are applied closely adjacent the perimeter of the annular end wall which might damage the threads or cause a curling back of metal over the threads. That is, the diameter of the annular shoulder 51 is slightly less than the minor, i.e., smallest diameter of the threads 21.

The wheel stud 11 is used in the wheel structure of a vehicle in the conventional manner. To remove the wheel stud 11 from the wheel structure, the nut (not shown) for the threads 21 and the sealing means 40 are removed, the wheel stud and the tool 41 are placed in the engaging position (FIG. 5) so that their longitudinal axes form a single straight line and the flat hammering head 45 is struck heavy blows with a large hammer. The force of the hammer blow is divided evenly between the back wall 29 and the annular end wall 27 by the protrusion end 53 and the annular shoulder 51. Because the force is evenly applied over a controlled area of the wheel stud 11, the amount of deformation is insignficant and the threads are protected from damage. If the wheel stud 11 cannot be removed as quickly as desired by hammering on the head 45, a wrench may be used on the flat wrench engaging surfaces 47 to transmit rotational forces through the triangular protrusion and the triangular recess to the wheel stud 11. The rotational forces may further help to break the wheel stud 11 free from whatever has caused it to be stuck in position.

Several features of this invention contribute to the protection of the threads and prevent the end receiving the force of the hammer blows from enlarging to prevent the wheel stud from being withdrawn from the wheel structure. Because the depth of the recess equals the length of the protrusion 49 and because the areas of engagement between the protrusion end 53 and the back wall 29 and the annular shoulder 51 and the annular end 27 are equal, the force of the hammer blows is evenly distributed between the back wall and the annular end wall. Because the perimeter of the annular shoulder 51 is entirely within and spaced from the perimeter of the annular end wall 27, no force is applied closely adjacent the perimeter of the annular end wall which would tend to deform or to damage the threads 21 forming or closely adjacent that perimeter. By centering the recess 25 on the annular end wall 27, an even distribution of the forces on the wheel stud 11 is further assured. Because the hammer directly strikes the head 45 in lieu of the wheel stud 11, the possibility of an inaccurate hammer blow striking the threads 21 or closely adjacent the perimeter of the annular end wall 27 is substantially eliminated. To further reduce deformation of the wheel stud 11, both it and the tool 41 are preferably constructed of a strong case hardened metal.

Another feature of this invention is to make the engaging surfaces of the tool 41 and the wheel stud 11 flat to reduce the possibility of splitting and of deforming the wheel stud 11. The depth of the back wall 29 of the recess 25 should be sufficient so that upon striking the tool 41 with a hammer, the tool will not be caused to bounce out of the recess. The edges of the protrusion end 53 may be slightly rounded or tapered to prevent deformation and enlargement of the protrusion end which might cause the latter to be difficult to disengage from the recess 25.

In use of the wheel stud 11, grease, dirt, and other contaminants may collect in the recess 25. Then, when the protrusion 49 is inserted therein, these contaminants which have collected on the back wall 29 or along the edges thereof may prevent the protrusion end 53 from engaging the back wall. Any build up of this sort on the back wall 29 would effectively alter the depth of the recess 25 thereby preventing engagement of the annular shoulder 51 and the annular end wall 27. Then maximum surface area of the wheel stud 11 would not be used and, therefore, undesirable stress concentrations would occur upon attempting to hammer the wheel stud free. To avoid this problem, the removable sealing means or cap 40 may be provided in the recess 25 to seal the latter against the accumulation of contaminants therein.

FIGS. 6 and 7 show another embodiment of a wheel stud and a battering removal tool. A wheel stud 71 which is identical to the wheel stud 11 in every respect except that the former has no battering removal tool recess, includes an elongated generally cylindrical member 73 having an annular end wall 75 exposed at one end thereof, an enlarged head 77 at the other end thereof, curved lateral surfaces 79 between the end wall and the head, a plurality of longitudinally extending splines 81 adjacent the head and screw threads 83 extending from adjacent the annular end wall toward the head.

Means is provided on the wheel stud 71 and a battering removal tool 85 for protecting the threads 83 when the wheel stud is being hammered from the wheeled vehicle. The battering removal tool 85 for removing the wheel stud from the vehicle includes a generally cylindrical shaft or battering removal projection 87 formed integrally with the end wall 75 and extending axially of the generally cylindrical member 73. The battering removal tool 85 is provided as an extension on the wheel stud 71 which is a standard length. The battering removal projection or shaft 87 has a smaller diameter than the cylindrical member 73 thereby leaving the annular end wall 75 or an annular portion of the end wall exposed. The end of the battering removal projection 87 which is remote from the annular end wall 75 forms a hammering surface 89, the area of which is slightly less than the cross-sectional area of the battering removal projection. To provide the hammering surface 89 with a surface area slightly less than the cross-sectional area of the projection 87, a small, rounded, frusto-conical, or stepped wall portion 91 is formed intermediate the hammering surface 89 and the cylindrical wall of the projection 87. If desired, the cylindrical wall of the projection 87 may be flattened to provide wrench gripping surfaces similar to the wrench engaging surfaces 47 on the tool 41.

The wheel stud 71 is used in wheel structures in the conventional manner. To remove the wheel stud 71 from the surrounding wheel structure, the retaining nut (not shown) for the threads 83 is removed and the hammering surface 89 is struck with a hammer thereby evenly applying that force to the wheel stud. Because the projection 87 is of smaller diameter than the wheel stud 71, the projection may become somewhat enlarged from the heavy hammer blows struck thereon and still the retaining nut may be threaded onto the threads 83. The hammer blows are most likely to enlarge the hammering surface 89 and therefore the area of the hammering surface is made slightly less than the cross-sectional area of the projection 87. The projection 87 must be of sufficient length so that any portion of the hammering surface 89 which may curve back will not interfere with or damage the threads 83. The embodiment shown in FIGS. 6 and 7 has the advantage of carrying the battering removal tool 85 integral therewith.

Many changes, modifications, and substitutions may be made without departing from the spirit and scope of this invention.

I claim:

1. A wheel stud for use in a wheeled vehicle and adapted for removal by a battering removal tool having a protrusion extending outwardly from a shoulder for a predetermined distance, comprising:
an elongated generally cylindrical member having an annular end wall at one end for engaging the shoulder of the battering removal tool and an enlarged head at the other end thereof, said generally cylindrical member having curved lateral surfaces between said annular end wall and said head, a plurality of longitudinally extending splines formed on said curved lateral surfaces adjacent said head, and screw threads formed on said curved lateral surfaces and extending from adjacent said annular end wall toward said head, said generally cylindrical member having a longitudinally extending battering removal tool recess of a depth substantially equal to the predetermined distance opening at said annular end wall, said recess having a back wall for engaging the end of the protrusion of the battering removal tool substantially simultaneously with the engagement of the shoulder and said end wall.

2. A wheel stud for use in a wheeled vehicle and adapted for removal by a battering removal tool having a protrusion extending outwardly from a shoulder for a predetermined distance, comprising:
an elongated generally cylindrical member having an annular end wall at one end thereof for engaging the shoulder of the battering removal tool and an enlarged head at the other end thereof, said generally cylindrical member having curved lateral surfaces between said end wall and said head, a plurality of longitudinally extending splines formed on said curved lateral surfaces adjacent said head, and screw threads formed on said curved lateral surfaces and extending from adjacent said annular end wall toward said head, said generally cylindrical member having a longitudinally extending battering removal tool recess of a depth substantially equal to the predetermined distance opening at and generally centered on said annular end wall, said recess having a back wall for engaging the end of the protrusion of the battering removal tool simultaneously with the engagement of the shoulder and said end wall, the surface area of said back wall being substantially equal to the surface area of said end wall which is engaged by the shoulder, said recess having at least one generally planar lateral wall.

3. A wheel stud as set forth in claim 2 wherein said recess is triangular in cross section.

4. A wheel stud as defined in claim 2 further comprising removable sealing means for sealing said recess to substantially prevent entry of solid matter therein.

5. In combination:
a wheel stud for use in a wheeled vehicle including an elongated generally cylindrical member having an end wall at one end thereof and an enlarged head at the other end thereof, said generally cylindrical member having curved lateral surfaces between said end wall and said head, a plurality of longitudinally extending splines formed on said curved lateral surfaces adjacent said head and screw threads formed on said curved lateral surfaces and extending from adjacent said end wall toward said head; and a battering removal tool for removing said wheel stud from the vehicle including a generally cylindrical battering removal projection formed integrally at said end wall and extending axially of said generally cylindrical member, said battering removal projection being of lesser diameter than said generally cylindrical member to thereby expose an annular portion of said end wall, the end of said battering removal projection remote from said annular portion of said end wall forming a hammering surface, the area of said hammering surface being slightly less than the cross-sectional area of said projection.

References Cited
UNITED STATES PATENTS

| | | | |
|---|---|---|---|
| 2,597,835 | 5/1952 | Eksergion. | |
| 2,861,330 | 11/1958 | Kratz | 29—275 |
| 2,979,092 | 4/1961 | Bradford | 145—46 |
| 3,107,570 | 10/1963 | Zifferer et al. | 85—2.4 |

WILLIAM FELDMAN, *Primary Examiner.*

MILTON S. MEHR, *Examiner.*